June 2, 1959          A. U. BRYANT          2,889,134
VALVE CONSTRUCTION
Filed Aug. 26, 1955          2 Sheets-Sheet 1
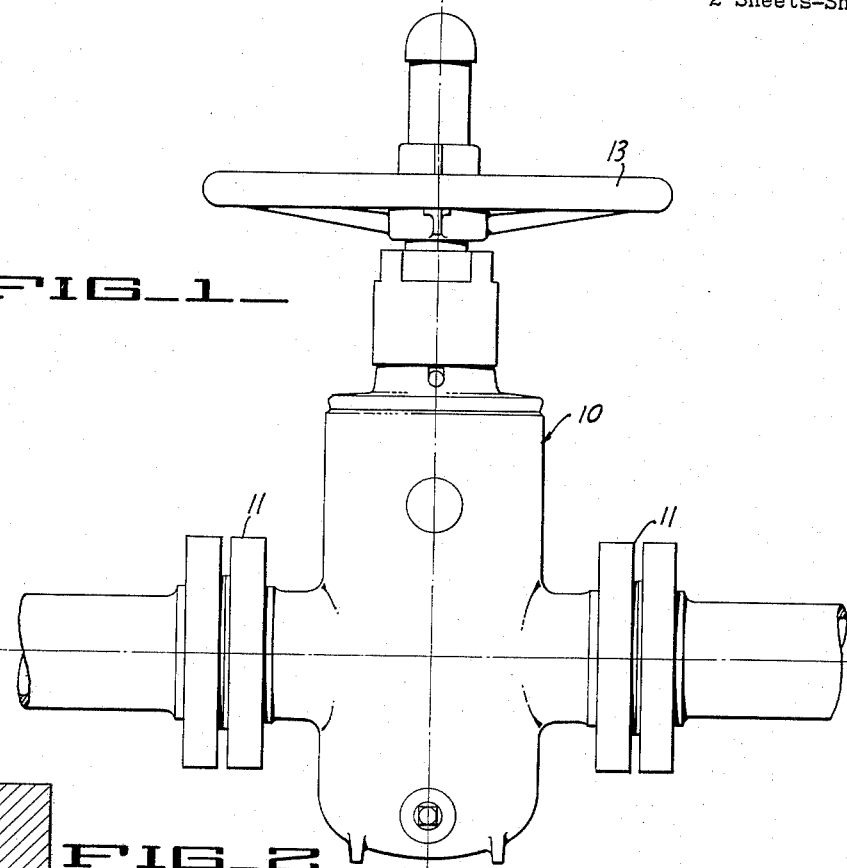
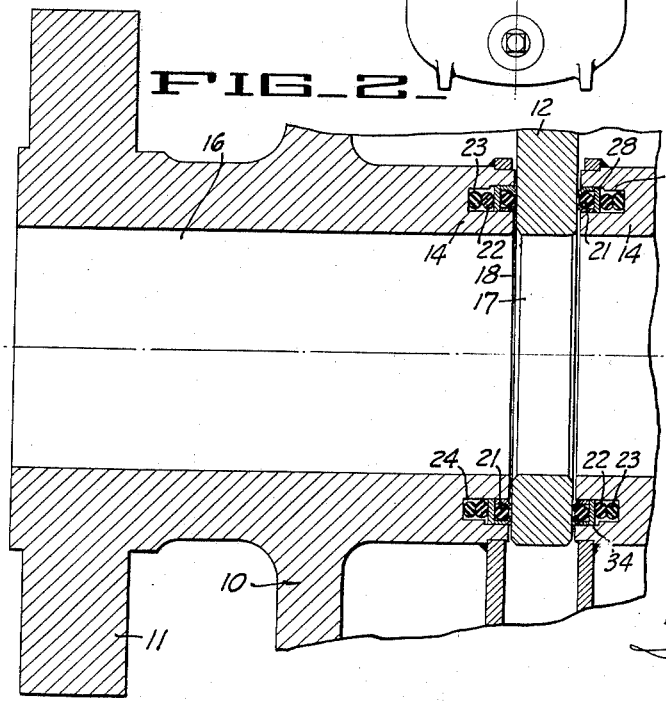
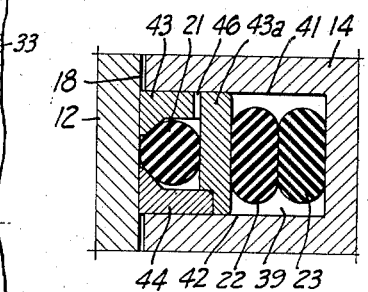
INVENTOR.
Austin U. Bryant
BY
ATTORNEYS

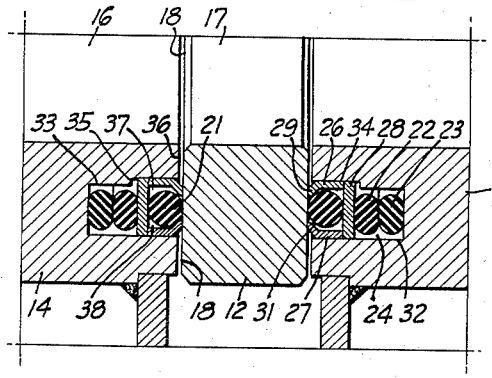
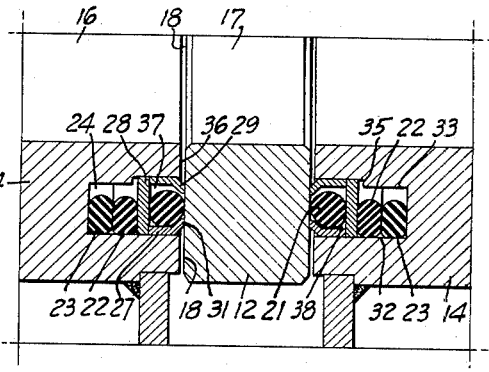
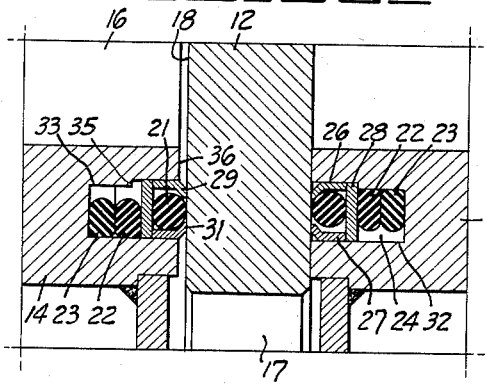
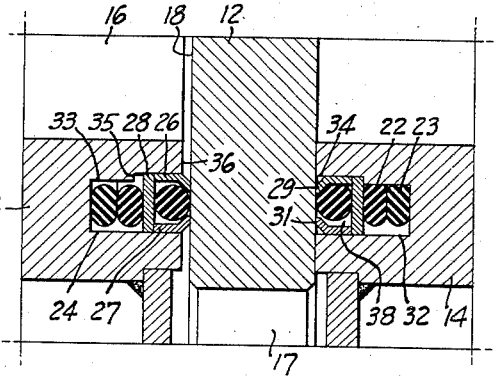
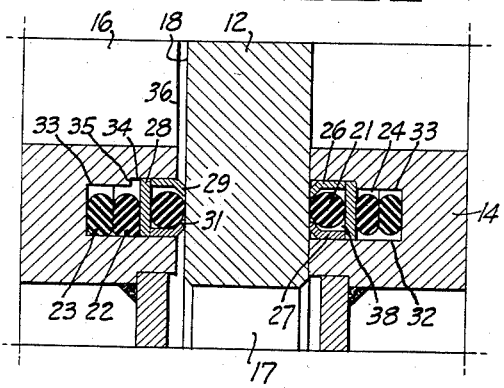

United States Patent Office 2,889,134
Patented June 2, 1959

2,889,134

VALVE CONSTRUCTION

Austin U. Bryant, Walnut Creek, Calif., assignor, by mesne assignments, to Walworth Company, New York, N.Y., a corporation of Massachusetts Application August 26, 1955, Serial No. 530,855

1 Claim. (Cl. 251—172)

This invention relates generally to valves of the type employing a movable gate or like valve member, together with sealing means of the O-ring type.

In copending application Serial No. 475,106 filed December 14, 1954, now Patent No. 2,810,543, for Valve Construction, there is disclosed a gate valve having sealing means of the O-ring type serving to form a seal between the gate and the valve body. The particular construction disclosed in said application employs seating rings movably carried by the body and urged toward the gate by means of mechanical springs. The seat rings are sealed with respect to the body, and carry sealing means of the O-ring type for establishing fluid type seals with respect to the gate. The use of such mechanical springs adds considerably to the cost of manufacture and complicates manufacture and assembly. If it is attempted to provide simple O-rings accommodated in grooves formed directly in annular portions of the valve body, relatively close tolerances are required to maintain the desired sealing contacts between the gate and the side surfaces of the O-ring.

In general it is the object of the present invention to provide a valve construction having novel sealing means of the O-ring type, which means obviates the use of mechanical springs.

Another object of the invention is to provide a novel valve construction which utilizes resilient O-rings for two purposes, namely for establishing a seal between the valve member and the body, and for assuming the function of mechanical springs.

Additional objects and features of the invention will appear from the following description in which the preferred embodiment has been set forth in detail in conjunction with the accompanying drawing.

Referring to the drawing:

Figure 1 is a side elevational view illustrating a valve of the gate type.

Figure 2 is an enlarged cross sectional detail illustrating the sealing means between the body and the valve gate.

Figures 3A to 3E inclusive are enlarged details illustrating various positions of the O-rings for different operating conditions.

Figure 4 is an enlarged cross sectional detail illustrating another embodiment of the invention.

In Figure 1, I have illustrated a typical type of gate valve consisting of a valve body 10 having flanges 11 or like coupling means for making connection with associated piping. The movable valve gate 12 within the valve body is operated by suitable means that may include the external handwheel 13. The body is provided with annular portions 14 that surround the alined flow passages 16. Preferably the gate is of the ported type, being provided with a port 17 that registers with the passages 16 for open position of the valve.

Sealing means of the O-ring type is carried by each of the annular portions 14, to establish seals with respect to the parallel side surfaces 18 of the valve gate. In the form of the invention illustrated in Figure 2 (also in Figures 3A–3E) the sealing means in each instance consists of a plurality of resilient O-rings. One resilient O-ring 21 makes sealing contact with the adjacent face of the gate, while the O-rings 22 and 23 are at all times compressed, and serve to apply thrust to the O-ring 21 and to its retaining means, whereby these parts are at all times urged toward the gate. An annular recess or groove 24 is formed in the annular portion 14 of the body to accommodate the O-rings. The retaining means for the O-ring 21 consists in this instance of inner and outer metal rings 26 and 27, which are loosely fitted within the groove 24, in conjunction with the flat annular ring 28. The rings 26 and 27 are formed to provide O-ring retaining lips 29 and 31. The spacing between these lips is substantially less than the diameter of the O-ring in section. The outer cylindrical defining surface 32 of the groove 24 is formed to one diameter, and the outer defining surface is formed to two diameters 33 and 34, each being cylindrical. This provides an annular shoulder 35 adapted to be contacted by one margin of ring 28.

Normally the O-rings 22 and 23 are compressed between their side faces, as illustrated for example in Figure 3A. Such compression applies thrust to each ring 28, and each ring 28 in turn applies thrust to the associated retaining rings 26 and 27 and the O-ring 21. The dimensioning of retaining rings 26 and 27 is such that O-ring 21 is likewise compressed a limited amount between its side faces, whereby it is pressed into sealing contact with the adjacent side face of the valve gate. Such compression is limited by the dimensioning of retainers 26 and 27.

The end faces 36 of the annular body portions 14 are machined to be parallel with a spacing slightly greater than the thickness of the gate. It may be explained that for closed position of the valve with fluid pressure applied to one side of the same, the gate is pressed toward and in close proximity with the surface 36 on the downstream side thereof. The proportioning may be such that most of such thrust is taken by retainers 26 and 27.

Operation of the embodiment described above is as follows: Assuming that the gate is in the open position shown in Figure 3A, and that either no pressure is being applied to the passages, or that the pressure is the same within both the passages and the valve body, then no pressure differential is applied to the O-rings, and the O-rings are permitted to assume their relaxed positions as illustrated in this figure. As previously pointed out, the O-rings 22 and 23 are compressed between their side faces, thereby yieldably applying thrust to the ring 28. This ring in turn urges the retaining rings 26 and 27 against the gate, and maintains each O-ring 21 under limited compression whereby its one side is urged into sealing contact with the gate. The gate will assume an intermediate position within the faces 36, due to the absence of pressure differential. Assuming now that line pressure is applied greater than the body pressure, the O-rings are caused to assume positions such as illustrated in Figure 3B. On both the upstream and downstream sides of the gate the O-rings 22 and 23 are urged against the defining surface 32, and prevent any leakage between the line passages and the body. The O-rings 21 are urged by pressure differential against the outer retainer ring 27, and maintain seals between the rings 28 and sides of the valve gate.

In Figure 3C it is assumed that the gate is closed and that the pressure in the body is intermediate the upstream and downstream pressures. The valve gate is pressed toward the face 36 on the downstream side, and such gate movement is followed by the O-ring 21 and its retaining means, on the upstream side. On the upstream side rings 22 and 23 are urged against surface 32 and on the downstream side against surface 33.

In Figure 3D the valve gate is in closed position, but the pressure in the body is the same as on the upstream side. Under such circumstances the O-rings on the upstream side of the gate are relaxed except for compression in a direction toward the gate, whereas the O-rings on the downstream side are urged inwardly. In other words O-rings 22 and 23 are urged against the retaining surface 33, and O-ring 21 is urged against the inner retainer 26.

Assuming again that the valve gate is in closed position, the positioning of the O-rings for atmospheric pressure within the body, is illustrated in Figure 3E. Here pressure differential upon the O-rings on the upstream side urges them outwardly, whereas on the downstream side the O-rings are relaxed except for compression in a direction toward the gate.

It will be evident from the foregoing that the construction of the present invention permits a considerable movement of the valve gate between the faces 36, without interrupting sealing contact between the O-rings 21 and the gate. Such relative movement between different operating positions is accommodated by the action of the O-rings 22 and 23. These O-rings at the same time prevent leakage between the ring 28 and the body.

In the construction described above it will be noted that the recess corners 37 and 38 are in pressure equalizing connection with the corresponding body passage and the body space respectively. This is by virtue of the loose fitting relationship between the retaining rings 26 and 27, and the defining surfaces 34 and 32 respectively. This pressure equalizing relationship serves to aid in preventing O-ring dislodgment when the valve is used on relatively high line pressures (e.g., 1,000 to 3,000 p.s.i. or higher), and is being operated between open and closed positions.

In the modification of the invention illustrated in Figure 4, the O-rings 22 and 23 are accommodated within the groove or recess 39, which is formed with cylindrical inner and outer defining surfaces 41 and 42. The retaining means for the O-ring 21 includes the inner retainer 43 formed L-shaped in section, and the outer retainer ring 44. The base portion 43a of ring 43 serves the function of the ring 28 of Figure 2. One or more ducts 46 can be provided for pressure equalization. The embodiment just described operates in substantially the same manner as the first described modification.

In both the embodiments of Figures 1–3 inclusive, and that of Figure 4, two resilient O-rings 23 and 24 have been employed to apply thrust to the sealing O-ring 21, and to the retainer for the same. It should be understood that in some instances one of the two rings 22 and 23 can be omitted, and a single O-ring employed to obtain the desired thrust. Likewise in some instances it may be desirable to use more than two such resilient O-rings.

It will be evident that various resilient or elastic materials can be used to make the O-rings. For many services it is satisfactory to form all of the O-rings of a suitable synthetic rubber, such as hycar or neoprene, and of a proper hardness. The O-ring 21 can be formulated to be somewhat harder than the O-rings 22 and 23, which is desirable for operation on relatively high line pressures. In place of synthetic rubbers, resilient or elastic materials such as Teflon, Kel F, and nylon can be employed. Here again the O-ring 21 can be made of relatively hard elastic material, and O-rings 22 and 23 made of relatively softer material.

I claim:

In a valve of the type having a valve body provided with flow passages and a valve member within the body movable in opposite directions between open and closed positions, rigid annular portions forming fixed parts of the body and disposed on opposite sides of the valve member, said portions forming annular metal seating surfaces adjacent the side faces of the valve member, said surfaces being adapted to engage the valve member and to take the thrust of fluid pressure applied to either side of the valve member, each of said portions being provided with an annular groove opening through the seating surface of the same, each groove being defined by inner and outer concentric surfaces and a bottom surface generally parallel to the corresponding seating surface, a plurality of resilient rings of the O-ring type disposed side by side in each of said grooves, a first one of said O-rings in each instance being disposed to contact and seal against the adjacent side face of the valve member, an annular retaining assembly for each of said first O-rings, each retaining assembly consisting of outer and inner concentric annular metal rings and a metal wall extending between said metal rings and interposed between the first and second O-rings, said retaining assembly being loosely fitted in the corresponding groove between the concentric defining surfaces of the same, the said second one of said O-rings in each instance being disposed and compressed between the metal wall of the retaining assembly for the corresponding O-ring and the said bottom surface and forming a seal between the same.

References Cited in the file of this patent

UNITED STATES PATENTS

| | | |
|---|---|---|
| 2,109,042 | Bennett | Feb. 22, 1938 |
| 2,529,412 | Parker | Nov. 7, 1950 |
| 2,547,831 | Mueller | Apr. 3, 1951 |
| 2,594,173 | Jensen | Apr. 22, 1952 |
| 2,628,060 | Parker | Feb. 10, 1953 |
| 2,674,436 | Jones | Apr. 6, 1954 |
| 2,747,611 | Hewitt | May 29, 1956 |

FOREIGN PATENTS

| | | |
|---|---|---|
| 716,610 | Great Britain | Oct. 13, 1954 |